(12) United States Patent
Komori et al.

(10) Patent No.: US 6,604,466 B2
(45) Date of Patent: Aug. 12, 2003

(54) COLOR MANAGEMENT METHOD AND APPARATUS FOR PRINTING PRESS

(75) Inventors: Yoshinori Komori, Ibaraki (JP); Akihiro Inde, Ibaraki (JP)

(73) Assignee: Komori Corporation, Tokyo (JP)

( * ) Notice: Subject to any disclaimer, the term of this patent is extended or adjusted under 35 U.S.C. 154(b) by 0 days.

(21) Appl. No.: 09/953,183

(22) Filed: Sep. 12, 2001

(65) Prior Publication Data

US 2002/0059879 A1 May 23, 2002

(30) Foreign Application Priority Data

Sep. 13, 2000 (JP) .................................. 2000-277906

(51) Int. Cl.⁷ .............................................. B41F 33/00
(52) U.S. Cl. ...................... 101/484; 101/483; 101/171; 101/181
(58) Field of Search .................. 101/484, 483, 101/171, 181; 400/76, 70, 61

(56) References Cited

U.S. PATENT DOCUMENTS 5,999,703 A * 12/1999 Schwartz et al.

OTHER PUBLICATIONS

U.S. patent application Publication, US 2002/0145744 A1, Oct. 10, 2002.*
"Specification of Colour of Materials according to the CIE 1976 (L*a*b) Space and the CIE 1976 (L*u*v) Space", JIS Z 8729–1980.
"Method for Specification of Colour Differences for Opaque Materials", JIS Z 8730–1980.

* cited by examiner

*Primary Examiner*—Charles H. Nolan, Jr.
(74) *Attorney, Agent, or Firm*—Blakely, Sokoloff, Taylor & Zafman

(57) ABSTRACT

In a color management method for a printing press, colorimetic values of a first patch for generating a profile printed by the printing press are measured, so that a printing press profile representing a color reproduction characteristic of the printing press is generated from the measured colorimetic values of the first patch and a dot area percent of each ink color predetermined in correspondence with the first patch. Colorimetic values of a second patch for determining stability of the printing press printed by the printing press are measured. The measured colorimetic values of the second patch is compared with colorimetic values, in the printing press profile, having a dot area percent substantially equal to a dot area percent of each ink color predetermined in correspondence with the second patch. A warning is generated on the basis of a comparison result. A color management apparatus for a printing press is also disclosed.

11 Claims, 8 Drawing Sheets

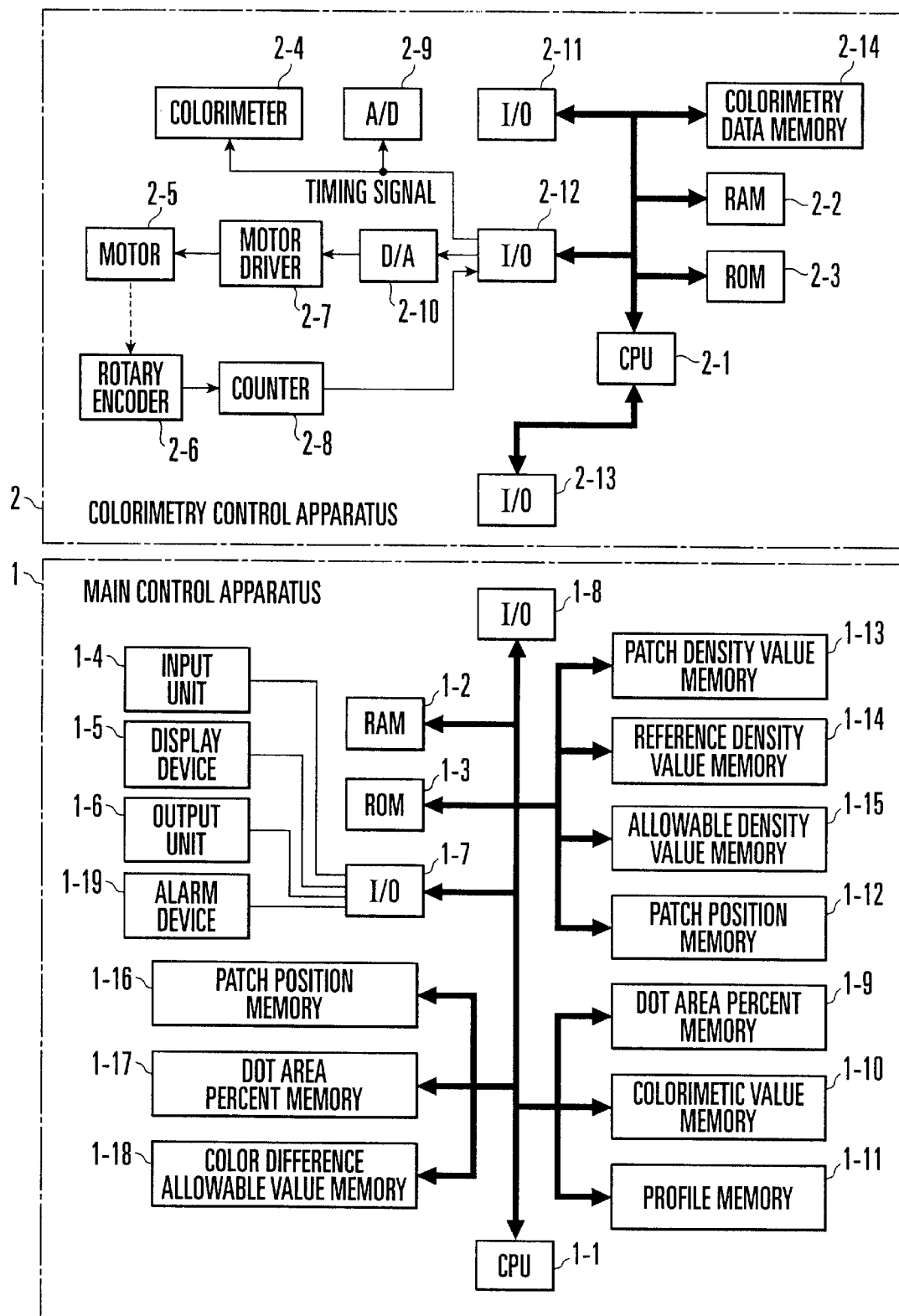
F I G. 1

COLOR MANAGEMENT METHOD AND APPARATUS FOR PRINTING PRESS

BACKGROUND OF THE INVENTION

The present invention relates to a color management method and apparatus for a printing press, which measure the colorimetic values of each profile generation patch printed by the printing press and generate a profile representing a color reproduction characteristic of the printing press from the measured colorimetic values of each patch and the dot area percent of each ink color predetermined in correspondence with each patch and, more particularly, to a color management method and apparatus for a printing press, having a function of checking the stability of the printing press.

Generally, when printing products are ordered, a color proofing print is presented to the customer in advance to confirm the tint of final printing products. More specifically, a color proofing print output from a color proofing apparatus (flat-bed proofing machine, color printer, DDCP (Direct Digital Color Proofer), or simplified proofing machine) is presented to the customer to confirm whether the tint is appropriate. If the customer agrees to the tint of the color proofing print, the ink supply amount of each ink color in a printing press is adjusted so that actual printing products are set to have the same tint as that of the color proofing print.

However, it is very difficult to obtain printing products with the same tint as that of the color proofing print by adjusting the ink supply amount of each ink color in the printing press because the color proofing apparatus and printing press have different color reproduction characteristics. Thus, the printing company has troubles with the customer in some cases.

To solve this, recently, the color reproduction characteristics of the color proofing apparatus and printing press are checked in advance, and color proofing is done by tint according to the tint of printing products printed by the printing press, thereby preventing troubles with the customer. More specifically, a profile representing the color reproduction characteristic of the color proofing apparatus is compared with a profile representing the color reproduction characteristic of the printing press, and, according to the comparison result, the dot area percent of each ink color in outputting a color proofing print, i.e., for a four color printing, the dot area percent (printed area of a color per unit area) of each of ink colors, including yellow, magenta (red), and cyan (blue), and black is adjusted such that the color proofing print and printing products printed by the printing press have the same tint. This processing of adjusting to have the same tint by the apparatus and printing press is called color matching.

The profile of an existing printing press provided by press makers has large error because a printing company employs various output conditions and printing conditions (e.g., output and printing environments, printing materials, inks, paper, reference density values, and client requirements). For this reason, the profile of a printing press is individually generated using a measurement device under the output and printing conditions in the printing company.

Generation of Profile of Printing Press

FIG. 9 shows a profile generation printing product printed by a printing press (not shown). A profile generation color chart 5-1 is printed at the center of a printing product 5. For a general four-color printing product using black, cyan, magenta, and yellow inks, the profile generation color chart 5-1 is formed from a number of patches 5a having different values in the dot area percent of the respective ink colors, e.g., black 5%, cyan 10%, magenta 10%, and yellow 10%, or black 5%, cyan 20%, magenta 10%, and yellow 20%. The colorimetic values of each patch 5a of the profile generation color chart 5-1 are measured, and the measured colorimetic values of each patch 5a are made to correspond to the dot area percent of each ink color predetermined in correspondence with each patch 5a, thus serving these relationships as the printing press profile.

In a case in which colors are managed using a profile, color matching precision depends on the stabilities of printing press and color proofing apparatus. Since the stabilities of the printing press and color proofing apparatus change in accordance with a change in environment or aging (e.g., the exhaustion of a blanket), the stabilities must be adjusted every time they change. The general color proofing apparatus is easily readjusted by an additional function called calibration, but the printing press does not have such a function. Thus, daily maintenance for the printing press is very important.

Even if the maintenance has been frequently done, the operator does not know when the stability of the printing press changes. When the operator does not find a change in stability of the printing press, the printing product printed by the printing press and the color proofing print output from the color proofing apparatus have the different tints until the next maintenance is done. When finding a change in stability of the printing press, the operator must adjust an ink supply amount manually to maintain color matching precision until the next maintenance is done. This operation is very time-consuming and imposes a severe burden on the operator.

SUMMARY OF THE INVENTION

It is an object of the present invention to provide a color management method and apparatus for a printing press, which can find a change in stability of the printing press early.

It is another object of the present invention to provide a color management method and apparatus for a printing press, which can easily maintain color matching precision within a short time even when the stability of the printing press changes.

In order to achieve the above objects, according to the present invention, there is provided a color management method for a printing press, comprising the steps of measuring colorimetic values of a first patch for generating a profile printed by the printing press to generate a printing press profile representing a color reproduction characteristic of the printing press from the measured colorimetic values of the first patch and a dot area percent of each ink color predetermined in correspondence with the first patch, measuring colorimetic values of a second patch for determining stability of the printing press printed by the printing press, comparing the measured colorimetic values of the second patch with colorimetic values, in the printing press profile, having a dot area percent substantially equal to a dot area percent of each ink color predetermined in correspondence with the second patch, and generating a warning on the basis of a comparison result.

BRIEF DESCRIPTION OF THE DRAWINGS

FIG. 1 is a block diagram showing a color management apparatus for a printing press according to an embodiment of the present invention;

DESCRIPTION OF THE PREFERRED EMBODIMENT

The present invention will be described below with reference to the accompanying drawings.

FIG. 1 shows a color management apparatus for a printing press according to an embodiment of the present invention. Referring to FIG. 1, the color management apparatus in this embodiment comprises a main control apparatus 1 and a colorimetry control apparatus 2 for controlling a calorimeter (to be described later) under the control of the main control apparatus 1.

The main control apparatus 1 comprises a CPU (Central Processing Unit) 1-1, RAM (Random Access Memory) 1-2, ROM (Read Only Memory) 1-3, input unit 1-4, display device 1-5, output unit 1-6, I/O interfaces 1-7 and 1-8, memories 1-9 to 1-18 (to be described later), and alarm unit 119. The CPU 1-1 obtains various input information supplied through the I/O interfaces 1-7 and 1-8 and operates in accordance with a program stored in the ROM 1-3 while accessing the RAM 1-2 or memories 1-9 to 1-18.

The colorimetry control apparatus 2 comprises a CPU 2-1, RAM 2-2, ROM 2-3, calorimeter 2-4, calorimeter moving motor 2-5, rotary encoder 2-6, motor driver 2-7, counter 2-8, A/D converter 2-9, D/A converter 2-10, I/O interfaces 2-11 to 2-13, and colorimetry data memory 2-14. The CPU 2-1 obtains various input information supplied through the I/O interfaces 2-11 to 2-13 and operates in accordance with a program stored in the ROM 2-3 while accessing the RAM 2-2 or colorimetry data memory 2-14. The rotary encoder 2-6 generates a rotary pulse every predetermined rotation count (angle) of the motor 2-5 and outputs the pulse to the counter 2-8.

Figure 2:
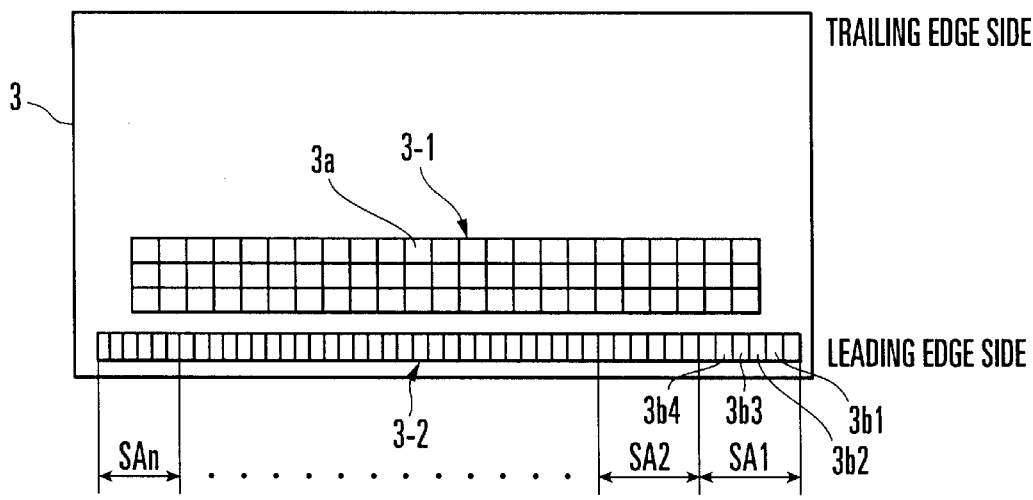
FIG. 2 is a plan view of a profile generation printing product printed by the printing press.

FIG. 2 shows a profile generation printing product, which is printed by a printing press (not shown). On the leading edge side of a printing product 3, a profile generation band-shaped color chart 3-1 and a density measurement color bar 3-2 are printed in the widthwise direction of a sheet (a direction perpendicular to a sheet convey direction). The color chart 3-1 and color bar 3-2 may be printed on the trailing edge side of the printing product 3 and may be printed at the center of the printing product 3.

For a four-color printing product using black, cyan, magenta, and yellow inks, the color chart 3-1 is formed from a number of patches (profile generation patches) 3a having different values in the dot area percent of the respective ink colors, e.g., black 5%, cyan 10%, magenta 10%, and yellow 10%, or black 5%, cyan 20%, magenta 10%, and yellow 20%.

The color bar 3-2 comprises a plurality of regions SA1 to SAn. For a four-color printing product, 100% (dot area percent) solid patches (density measurement patches) 3b1 to 3b4 of black, cyan, magenta, and yellow (for the respective ink colors) are printed in each of the regions SA1 to SAn. The regions SA1 to SAn correspond to key zones of fountain keys parallel to the axial direction of a plate cylinder in the printing unit of each ink color in the printing press.

Figure 3:
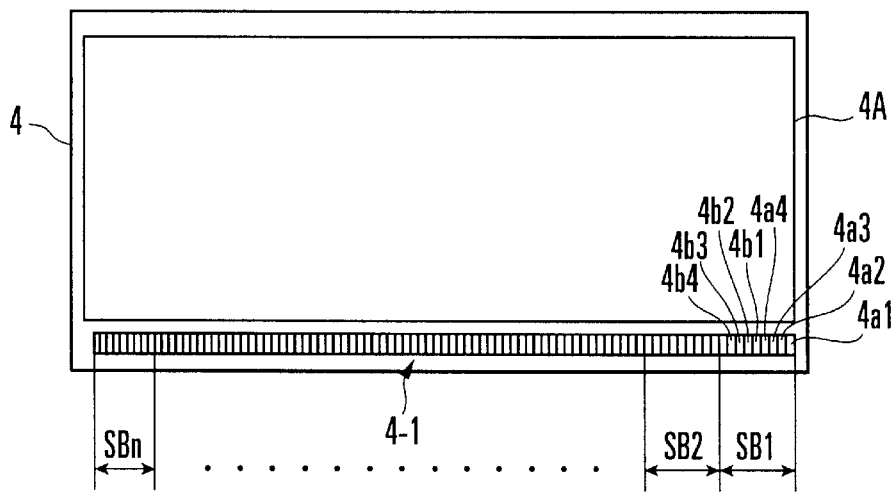
FIG. 3 is a plan view of a printing product printed by the printing press in ordinary printing.

FIG. 3 shows a printing product printed by the printing press in ordinary printing. For a printing product 4 in ordinary printing, a band-shaped ordinal printing color bar 4-1 is printed in the margin portion except a pattern region 4A. The color bar 4-1 comprises a plurality of regions SB1 to SBn. For a four-color printing product, 100% (dot area percent) solid patches (density measurement patches) 4b1 to 4b4 of black, cyan, magenta, and yellow (for the respective ink colors) and patches (printing press stability determination patches) 4b1 to 4b4 having different values in the dot area percent of the respective ink colors are printed in each of the regions SB1 to SBn. The regions SB1 to SBn respectively correspond to key zones of fountain keys parallel to the axial direction of the plate cylinder in the printing unit of each ink color in the printing press.

In this embodiment, representative patches are chosen from the color chart 3-1 shown in FIG. 2 and incorporated in the region SB1 to SBn as the printing press stability determination patches (to be referred to as stability determination patches) 4b1 to 4b4. In a color bar 4-1, the density measurement patches 4a1 to 4a4 and the stability determination patches 4b1 to 4b4 are independently formed in each region, as shown in FIG. 3.

In the main control apparatus 1, the dot area percent memory 1-9 stores the position of each patch 3a of the color chart 3-1 printed on the printing product 3, and the dot area percent (a printed area of a color per unit area, e.g., percentage of dots in this color) of each ink color predetermined in correspondence with each patch 3a. Predetermined dot area percent of the respective ink colors, e.g., 5% for black, 10% for cyan, 10% for magenta, and 10% for yellow are stored in correspondence with the first patch 3a as the dot area percent of the respective ink colors, 5% for black, 20% for cyan, 10% for magenta, and 20% for yellow are stored in correspondence with the second patch 3a as the dot area percent of the respective ink colors and, 0% for black, 10% for cyan, 50% for magenta, and 20% for yellow are stored in correspondence with the third patch 3a as the dot area percent of the respective ink colors.

The colorimetic value memory 1-10 stores colorimetic values obtained from the color data of each patch 3a of the color chart 3-1, which is sampled by the calorimeter 2-4. Color data sampling from the patches 3a using the calorimeter 2-4 will be described later.

For example, the colorimetric values comprise a psychometric lightness L* representing a color space and psychometric chroma coordinates a* and b*, which are defined by CIE (Commission Internationale de l'Eclairage). The psychometric lightness L* and the psychometric chroma coordinates a* and b* or u* and v* are described in detail in "Specification of Colour of Materials according to the CIE 1976 (L*a*b*) Space and the CIE 1976 (L*u*v*) Space", JIS Z 8729, February 1980 (reference 1) and "Method for Specification of Colour Differences for Opaque Materials", JIS Z 8730, February 1980 (reference 2).

The profile memory 1-11 stores a profile representing the color reproduction characteristic of the printing press. The procedure of generating a printing press profile to be stored in the profile memory 1-11 will be described later. The patch position memory 1-12 stores the positions of the patches 3*b* (3*b*1, 3*b*2, 3*b*3, and 3*b*4) for the respective ink colors of the color bar 3-2 printed on the printing product 3.

The patch position memory 1-16 stores the positions of the density measurement patches 4*a* in the color bar 4-1 printed on the printing product 4. The dot area percent memory 1-17 stores the positions of the printing press stability determination patches 4*b* in the color bar 4-1 printed on the printing product 4, and the dot area percent of each ink color, which is predetermined in correspondence with each patch 4*b*. The color difference allowable value memory 1-18 stores color difference allowable values of the printing press stability determination patches 4*b* in the color bar 4-1 printed on the printing product 4.

The patch density memory 1-13 stores density values obtained from the color data of the patches 3*b*1 to 3*b*4 of the respective ink colors of the color bar 3-2, which are sampled by the calorimeter 2-4, and density values obtained from the color data of the density measurement patches 4*a*1 to 4*a*4 of the respective ink colors of the color bar 4-1, which are sampled by the calorimeter 2-4. The reference density value memory 1-14 stores reference density values (reference density value for each ink color) in correspondence with the patches 3*b*1 to 3*b*4 of the respective ink colors of the color bar 3-2 and the density measurement patches 4*a*1 to 4*a*4 of the respective ink colors of the color bar 4-1. The allowable density value memory 1-15 stores allowable density values (allowable density value for each ink color) in correspondence with the patches 3*b*1 to 3*b*4 of the respective ink colors of the color bar 3-2 and the density measurement patches 4*a*1 to 4*a*4 of the respective ink colors of the color bar 4-1.

Figure 4:
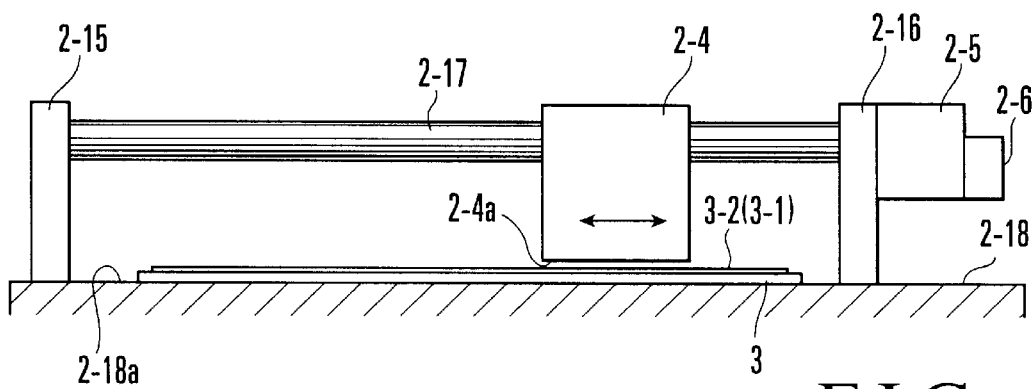
FIG. 4 is a view showing the arranged state of a calorimeter shown in FIG. 1.

In the colorimetry control apparatus 2, the calorimeter 2-4 is attached to a ball screw (feed screw) 2-17 provided between columns 2-15 and 2-16, as shown in FIG. 4. The ball screw 2-17 is rotated in the forward or reverse direction by the motor 2-5. As the ball screw 2-17 rotates in the forward or reverse direction, the colorimeter 2-4 is guided by the ball screw 2-17 and moves between the columns 2-15 and 2-16. A head portion 2-4*a* of the colorimeter 2-4 opposes a surface 2-18*a* of a measuring table 2-18, on which a measurement target is placed.

Figure 5:
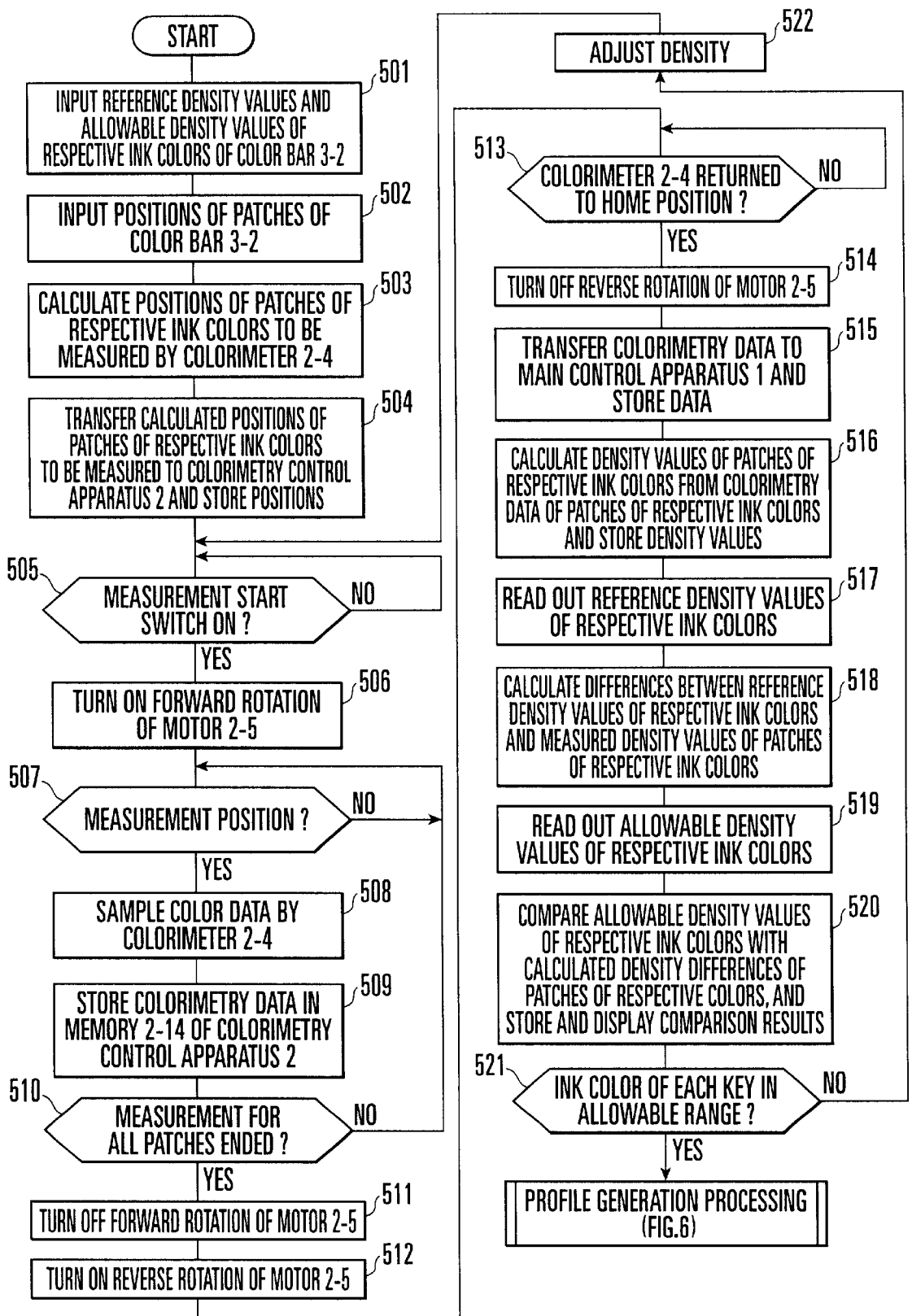
FIG. 5 is a flow chart for explaining density adjustment before printing press profile generation.

Density Adjustment Before Generation of Profile of Printing Press (FIG. 5)

The profile generation printing product 3 (FIG. 2) is printed by the printing press. For the printing product 3, the profile generation color chart 3-1 and the density measurement color bar 3-2 are printed, as described above. The color chart 3-1 is formed from the patches 3*a* each having predetermined dot area percent (%) of the respective ink colors. The color bar 3-2 comprises the regions SA1 to SAn containing the patches 3*b*1 to 3*b*4 of the respective ink colors.

The operator sets the printing product 3 immediately after printing on the measuring table 2-18 (FIG. 4) as a measurement target. In this set state, the color bar 3-2 printed on the printing product 3 opposes the lower surface of the head portion 2-4*a* of the calorimeter 2-4. The operator inputs, from the input unit 1-4, reference density values and allowable density values in correspondence with the patches 3*b* of the respective ink colors of the color bar 3-2 (step S501). The operator also inputs, from the input unit 1-4, the positions of the patches 3*b*1 to 3*b*4 of the respective ink colors of the color bar 3-2 (step S502).

The CPU 1-1 stores, in the memory 1-12, the input positions of the patches 3*b*1 to 3*b*4 of the respective ink colors of the color bar 3-2. The positions (measurement positions) of the patches 3*b*1 to 3*b*4 of the respective ink colors to be measured by the calorimeter 2-4 are calculated (step S503), and the calculated measurement positions are transferred to the colorimetry control apparatus 2 (step S504). The transferred measurement positions of the patches 3*b*1 to 3*b*4 of the respective ink colors are stored in the RAM 2-2.

Next, the operator turns on the density measurement start switch (not shown) of the input unit 1-4. When the start switch is turned on (YES in step S505), the CPU 1-1 of the main control apparatus 1 sends a measurement start command to the CPU 2-1 of the colorimetry control apparatus 2. Upon receiving the measurement start command from the main control apparatus 1, the CPU 2-1 of the colorimetry control apparatus 2 rotates the colorimeter moving motor 2-5 in the forward direction (step S506).

As the calorimeter moving motor 2-5 rotates in the forward direction, the ball screw 2-17 rotates in the forward direction, and the calorimeter 2-4 is guided by the ball screw 2-17 and moves toward the column 2-15 from the home position where the calorimeter 2-4 is in contact with the column 2-16. The CPU 2-1 monitors the momentary moving position of the calorimeter 2-4 through the rotary encoder 2-6 (step S507). When the calorimeter 2-4 reaches the first measurement position stored in the RAM 2-2, the color data of one of the patches 3*b*1 to 3*b*4 corresponding to the measurement position is sampled by the calorimeter 2-4 (step S508). The CPU 2-1 stores the color data (colorimetry data) from the calorimeter 2-4 in the memory 2-14 (step S509).

In a similar way, every time the calorimeter 2-4 reaches a measurement position stored in the RAM 2-2, the CPU 2-1 samples the color data of one of the patches 3*b*1 to 3*b*4 located at the measurement position by the calorimeter 2-4 and stores the sampled color data in the memory 2-14. That is, the CPU 2-1 controls automatic scanning of the calorimeter 2-4, thereby sequentially sampling the color data of the patches 3*b*1 to 3*b*4 of the respective ink colors of the color bar 3-2 printed on the printing product 3.

The CPU 2-1 determines whether color data sampling for all patches 3*b*1 to 3*b*4 of the color bar 3-2 is ended (step S510). When sampling is ended, the forward rotation of the calorimeter moving motor 2-5 is stopped (step S511). Next, the CPU 2-1 rotates the calorimeter moving motor 2-5 in the reverse direction (step S512) to return the calorimeter 2-4 to the home position and then stops reverse rotation of the calorimeter moving motor 2-5 (steps S513 and S514).

The CPU 2-1 transfers the colorimetry data of the patches 3*b*1 to 3*b*4 of the respective ink colors, which are stored in the memory 2-14, to the main control apparatus 1 (step S515). The transferred colorimetry data of the patches 3*b*1 to 3*b*4 of the respective ink colors are stored in the RAM 1-2. The CPU 1-1 of the main control apparatus 1 calculates density values of the patches 3*b*1 to 3*b*4 of the respective ink colors from the colorimetry data of the patches 3*b*1 to 3*b*4 of the respective ink colors from the colorimetry control apparatus 2 and stores them in the memory 1-13 (step S516).

In this embodiment, the spectrometer is used as the calorimeter 2-4. The transmittances, for the respective wavelengths, of a filter used in measuring the solid patches of the respective ink colors by a densitometer are multiplied by output values of the wavelengths from the spectrometer. The resultant products are summed to obtain density values of the respective ink colors.

The CPU 1-1 reads out the reference density value of each ink color from the memory 1-14 (step S517), and calculates the differences between the reference density values of the respective ink colors and the measured density values of the patches 3b1 to 3b4 of the respective ink colors stored in the memory 1-13 (step S518). Next, the CPU 1-1 reads out the allowable density values of the respective ink colors from the memory 1-15 (step S519), and compares the allowable values of the respective ink colors with the differences between the reference density values of the respective ink colors and the measured density values of the patches 3b1 to 3b4 of the respective ink colors calculated in step S518. The comparison results are stored in the RAM 1-2 and displayed on the screen of the display device 1-5 (step S520).

The processes in steps S517 to S520 described above are performed for the patches 3b1 to 3b4 of the respective ink colors in the regions SA1 to SAn of the color bar 3-2. At this time, for the regions SA1 to SAn, if there is at least one patch having the difference between its measured density value and the corresponding reference density value, which exceeds the corresponding allowable density value (NO in step S521), the opening amounts (ink supply amounts) of the fountain keys in the printing unit of the color corresponding to that patch are controlled (step S522).

Next, the printing product 3 is printed again by the printing press whose ink supply amounts are controlled, and the printing product 3 immediately after printing is set on the measuring table 2-18 as a measurement target. In this set state, when the operator turns on the density measurement start switch (YES in step S505), the processes subsequent to step S506 are repeated.

In the above embodiment, the opening amounts (ink supply amounts) of the fountain keys are automatically controlled using the control unit in accordance with the difference between the measured density value and reference density value. However, the operator may manually adjust the opening amounts (ink supply amounts) of the fountain keys in accordance with the difference between the measured density value and reference density value.

Figure 6:
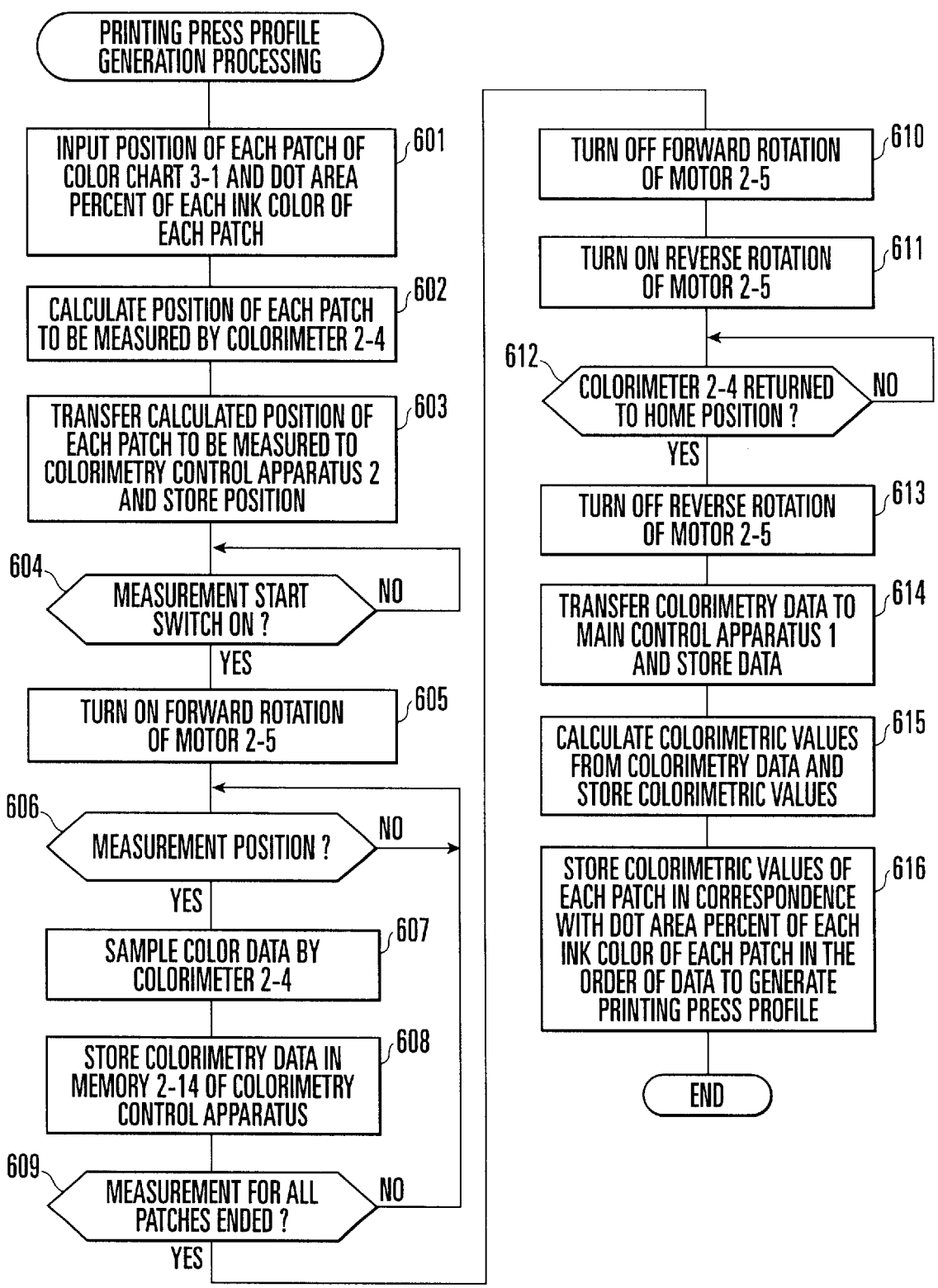
FIG. 6 is a flow chart for explaining printing press profile generation processing.

In step S521, for all the regions SA1 to SAn of the color bar 3-2, if the differences between the reference density values of the respective ink colors and the measured density values of the patches 3b1 to 3b4 of the respective ink colors are equal to or smaller than the allowable density values of the respective ink colors, the process advances to the printing press profile generation processing shown in FIG. 6.

Generation of Profile of Printing Press (FIG. 6)

First, the operator resets the printing product 3 such that the profile generation color chart 3-1 printed on the printing product 3 opposes the lower surface of the head portion 2-4a of the calorimeter 2-4. The operator then inputs, from the input unit 1-4, the position of each patch 3a of the color chart 3-1 and the dot area percent of each ink color of each patch 3a of the color chart 3-1 (step S601). The input dot area percent of each ink color of each patch 3a is not a measurement value from a printing plate on which each patch 3a is printed or a printing product 3 on which each patch 3a is actually printed, but a value of each ink color predetermined for each patch 3a. More specifically, a value actually input to the printing plate printing apparatus in correspondence with each patch 3a in generating the printing plate for each ink color of the printing product 3 is used as a set value, and this set value is input in step S601 as the dot area percent of each ink color of each patch 3a.

The CPU 1-1 stores in the memory 1-9 the input position of each patch 3a of the color chart 3-1 and the input dot area percent of each ink color of each patch 3a. The CPU 1-1 calculates the position (measurement position) of each patch 3a to be measured by the colorimeter 2-4 (step S602), and transfers the calculated measurement position to the colorimetry control apparatus 2 (step S603). The transferred measurement position of each patch 3a is stored in the RAM 2-2.

Next, the operator turns on the printing press profile generation start switch (not shown) of the input unit 1-4. When the start switch is turned on (YES in step S604), the CPU 1-1 of the main control apparatus 1 sends a measurement start command to the CPU 2-1 of the colorimetry control apparatus 2. Upon receiving the measurement start command from the main control apparatus 1, the CPU 2-1 of the colorimetry control apparatus 2 rotates the motor 2-5 in the forward direction (step S605).

As the motor 2-5 rotates in the forward direction, the ball screw 2-17 rotates in the forward direction, and the colorimeter 2-4 is guided by the ball screw 2-17 and moves toward the column 2-15 from the home position where the colorimeter 2-4 is in contact with the column 2-16. The CPU 2-1 monitors the momentary moving position of the colorimeter 2-4 through the rotary encoder 2-6 (step S606). When the colorimeter 2-4 reaches the first measurement position stored in the RAM 2-2, the CPU 2-1 samples the color data of the patch 3a located at the measurement position by the colorimeter 2-4 (step S607). The CPU 2-1 stores the color data (colorimetry data) output from the colorimeter 2-4 in the colorimetry data memory 2-14 (step S608).

In a similar way, every time the colorimeter 2-4 reaches a measurement position stored in the RAM 2-2, the CPU 2-1 samples the color data of the patch 3a located at the measurement position by the calorimeter 2-4 and stores the sampled color data in the memory 2-14. That is, the CPU 2-1 controls automatic scanning of the calorimeter 2-4, thereby sequentially sampling the color data of the patches 3a of the color chart 3-1 output to the printing product 3.

The CPU 2-1 determines whether color data sampling for all patches 3a of the color chart 3-1 is ended (step S609). When sampling is ended, the forward rotation of the calorimeter moving motor 2-5 is stopped (step S610). Next, the CPU 2-1 rotates the calorimeter moving motor 2-5 in the reverse direction (step S611) to return the calorimeter 2-4 to the home position and then stops reverse rotation of the calorimeter moving motor 2-5 (steps S612 and S613).

As shown in FIG. 2, if the color chart has three lines, the operator repeats the steps S504 to S513 three times while resetting the printing product 3 such that the profile generation color chart in each line opposes the lower surface of the head portion 2-4a of the calorimeter 2-4. Thus, the color data of the patches 3a of the entire color chart 3-1 can be sampled.

The CPU 2-1 transfers the color data of each patch 3a, which is stored in the memory 2-14, to the main control apparatus 1 (step S614). The transferred colorimetry data of each patch 3a is stored in the RAM 1-2. The CPU 1-1 of the main control apparatus 1 calculates colorimetic values from the color data of each patch 3a from the colorimetry control apparatus 2 and stores them in the memory 1-10 (step S615). Next, the CPU 1-1 makes the colorimetic values of each patch 3a in the memory 1-10 correspond to the dot area percent of each ink color of each patch 3a, which is stored in the memory 1-9, in the order of data, and stores these relationships in the memory 1-11 as the printing press profile (step S616).

In this embodiment, by the density adjustment according to FIG. 5, the colorimetic values of each patch 3a of the color chart 3-1 are measured in a state in which the ink film thickness of each ink color is almost uniform, thus generating the high-quality printing press profile. In addition, the allowable density values of the respective ink colors are compared with the differences between the reference values of the respective ink colors and the measured values of the patches 3b of the respective ink colors of the color bar 3-2, so that the density can easily be adjusted within a short time independently of the experience or intuition of the operator. Thus, the high-quality printing press profile can be always generated.

Figure 7:
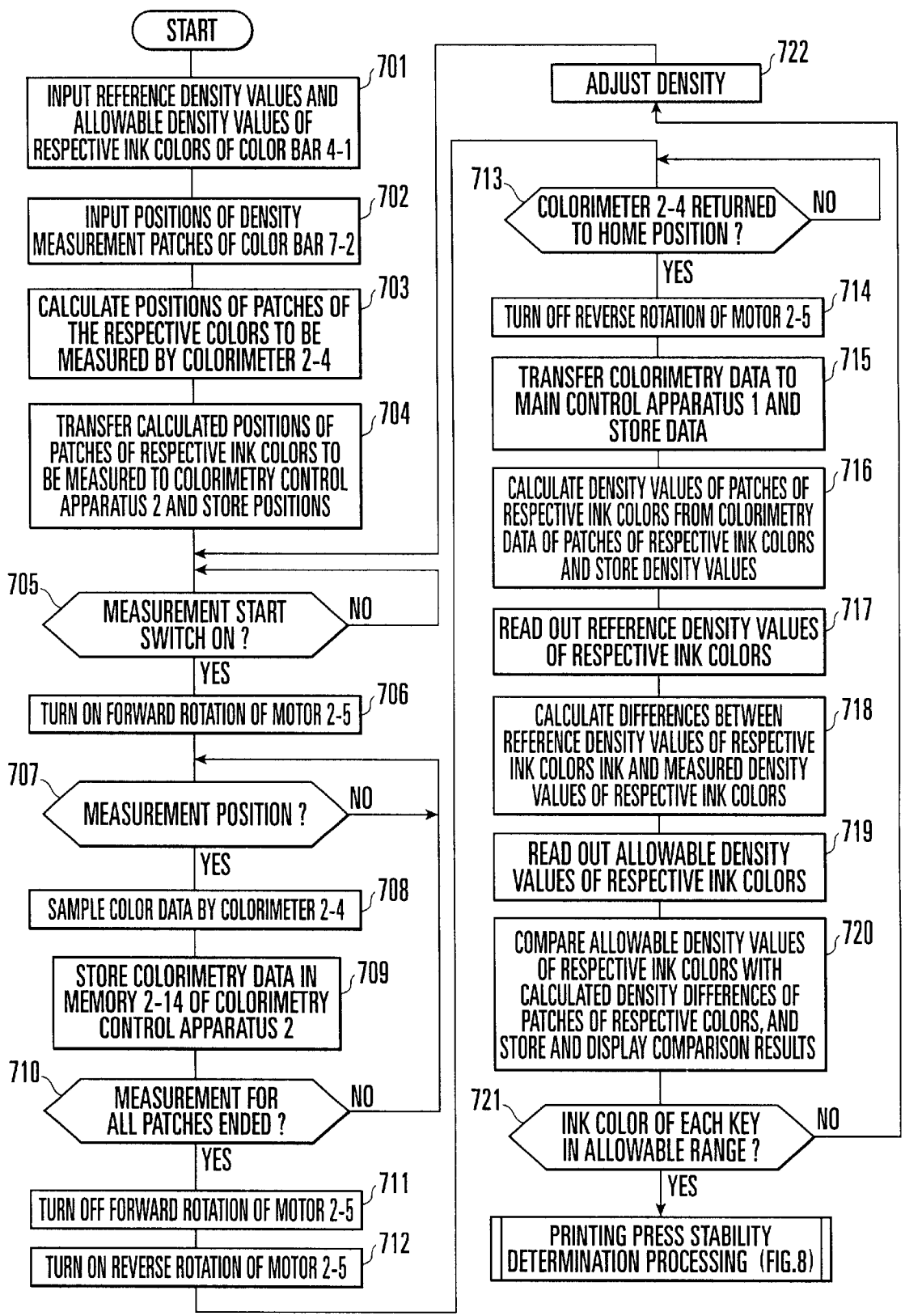
FIG. 7 is a flow chart for explaining density adjustment before printing press stability determination.

Density Adjustment Before Determination of Stability of Printing Press (FIG. 7)

The ordinary printing product 4 (FIG. 3) is printed by the printing press. For the printing product 4, the ordinary printing color bar 4-1 is printed on the margin portion except the pattern region 4A, as described above. The color bar 4-1 comprises the regions SB1 to SBn containing the density measurement patches 4a1 to 4a4 and the stability determination patches 4b1 to 4b4.

The operator sets the printing product 4 immediately after printing by the printing press on the measuring table 2-18 (FIG. 4) as a measurement target. In this set state, the color bar 4-1 printed on the printing product 4 opposes the lower surface of the head portion 2-4a of the calorimeter 2-4.

The operator inputs, from the input unit 1-4, reference density values and allowable density values in correspondence with the density measurement patches 4a1 to 4a4 of the respective ink colors of the color bar 4-1 (step S701). The operator also inputs, from the input unit 1-4, the positions of the density measurement patches 4a1 to 4a4 of the respective ink colors of the color bar 4-1 (step S702). The reference density values and allowable density values in step S701 are the same values as those for the patches 3b1 to 3b4 of the respective ink colors of the color bar 3-2 in printing press profile generation.

The CPU 1-1 stores, in the memory 1-16, the input positions of the density measurement patches 4a1 to 4a4 of the respective ink colors of the color bar 4-1. The positions (measurement positions) of the patches 4a1 to 4a4 of the respective ink colors to be measured by the calorimeter 2-4 are calculated (step S703), and the calculated measurement positions are transferred to the colorimetry control apparatus 2 (step S704). The transferred measurement positions of the patches 4a1 to 4a4 of the respective ink colors are stored in the RAM 2-2.

Next, the operator turns on the density measurement start switch (not shown) of the input unit 1-4. When the start switch is turned on (YES in step S705), the CPU 1-1 executes the processes in steps S706 to S720 corresponding to the steps S506 to S520 shown in FIG. 5.

The processes in steps S717 to S720 are performed for the density measurement patches 4a1 to 4a4 of the respective ink colors in the regions SB1 to SBn of the color bar 4-1. For the regions SB1 to SBn, if there is at least one patch having the difference between its measured density value and the corresponding reference density value, which exceeds the corresponding allowable density value (NO in step S721), the opening amounts (ink supply amounts) of the fountain keys in the printing unit of the ink color, which corresponds to that patch, are controlled (step S722).

Next, the printing product 4 is printed again by the printing press whose ink supply amounts are controlled, and the printing product 4 immediately after printing is set on the measuring table 2-18 as a measurement target. In this set state, when the operator turns on the density measurement start switch (YES in step S705), the processes subsequent to step S706 are repeated.

In the above embodiment, the opening amounts (ink supply amounts) of the fountain keys are automatically controlled using the control unit in accordance with the difference between the measured density value and reference density value. However, the operator may manually adjust the opening amounts (ink supply amounts) of the fountain keys in accordance with the difference between the measured density value and reference density value.

Figure 8:
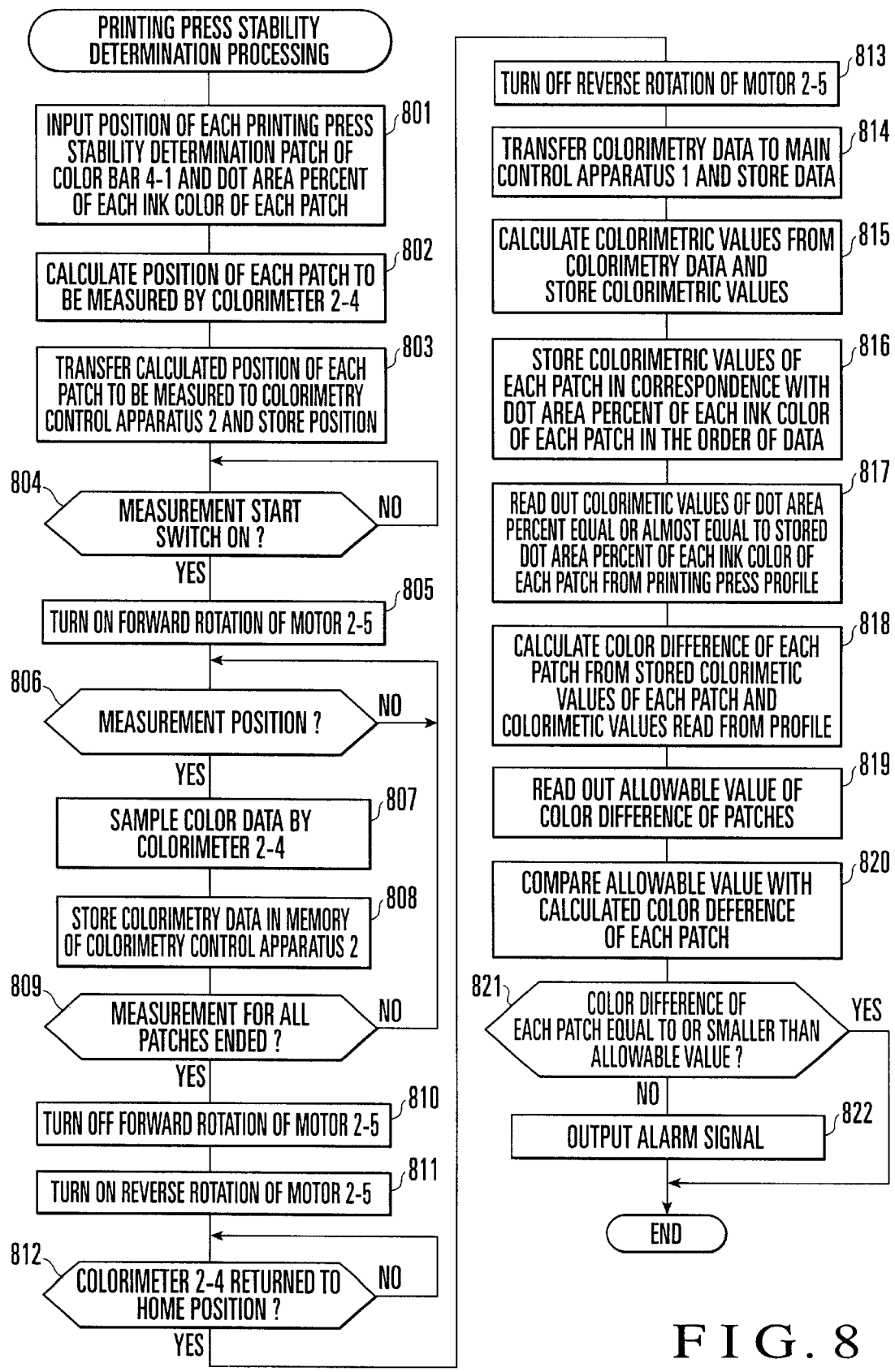
FIG. 8 is a flow chart for explaining printing press stability determination processing.
Figure 9:
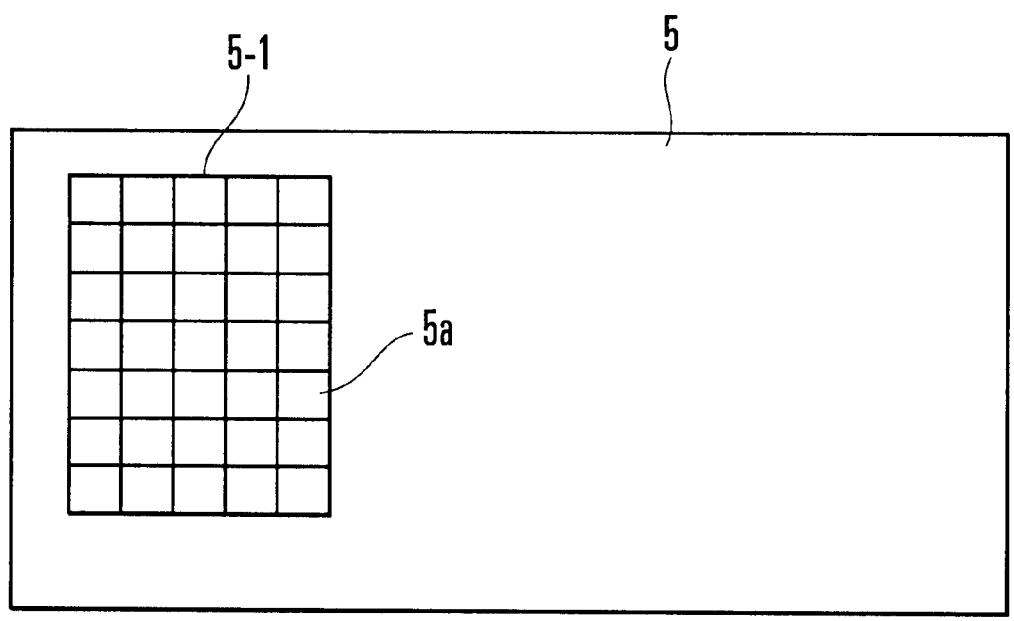
FIG. 9 is a plan view of a conventional profile generation printing product.

In step S721, for all the regions SB1 to SBn, if the differences between the reference density values of the respective ink colors and the measured density values of the density measurement patches 4a1 to 4a4 of the respective ink colors of the color bar 4-1 are equal to or smaller than the allowable density value of the respective ink colors, the process advances to the printing press stability determination processing shown in FIG. 8.

Determination of Stability of Printing Press (FIG. 8)

The operator inputs, from the input unit 1-4, the positions of the printing press stability determination patches 4b1 to 4b4 of the ordinary printing color bar 4-1 and the dot area percent of each ink color of each of the patches 4b1 to 4b4 (step S801). The input dot area percent of each ink color of each of the patches 4b1 to 4b4 is not a measurement value from a printing plate on which the patches 4b1 to 4b4 are printed or a printing product 4 on which the patches 4b1 to 4b4 are actually printed, but a value of each ink color predetermined for each of the patches 4b1 to 4b4. More specifically, a value actually input to the printing plate printing apparatus in correspondence with each of the patches 4b1 to 4b4 in generating the printing plate for each ink color of the printing product 4 is used as a set value, and this set value is input in step S801 as the dot area percent of each ink color of each of the patches 4b1 to 4b4.

The CPU 1-1 stores, in the memory 1-17, the input position of each of the printing press stability determination patches 4b1 to 4b4 and the input dot area percent of each ink color of each of the patches 4b1 to 4b4. The CPU 1-1 calculates the position (measurement position) of each of the patches 4b1 to 4b4 to be measured by the calorimeter 2-4 (step S802), and transfers the calculated measurement position to the colorimetry control apparatus 2 (step S803). The transferred measurement position of each of the patches 4b1 to 4b4 is stored in the RAM 2-2.

Next, the operator turns on the printing press stability determination start switch (not shown) of the input unit 1-4. When the start switch is turned on (YES in step S804), the CPU 1-1 executes the processes in steps S805 to S816 corresponding to the steps S605 to S616 shown in FIG. 6. Thus, the CPU 1-1 makes the colorimetic values of each of the printing press stability determination patches 4b1 to 4b4 correspond to the dot area percent of each ink color of each of the patches 4b1 to 4b4 stored in the memory 1-17, and stores these relationships in the RAM 1-2.

The CPU 1-1 of the main control apparatus 1 reads out, from the printing press profile stored in the memory 1-11, the colorimetic values having a dot area percent equal to that of each ink color of each of the printing press stability determination patches 4b1 to 4b4, which is stored in the RAM 1-2 in step S816 (step S817). The CPU 1-1 calculates the color differences of the patches 4*b*1 to 4*b*4 from the colorimetic values read out from the printing press profile and the colorimetic values of each of the printing press stability determination patches 4*b*1 to 4*b*4, which are stored in the RAM 1-2 (step S818). More specifically, the CPU 1-1 calculates the color differences of the patches 4*b*1 to 4*b*4 from the colorimetic values of each of the printing press stability determination patches 4*b*1 to 4*b*4, which are measured in steps S805 to S816, and the colorimetic values, in the printing press profile, having a dot area percent almost equal to that of each ink color determined with respect to each of the patches 4*b*1 to 4*b*4.

When using "L* value, a* value, and b* value" as the colorimetic values, a color difference $\Delta E^*_{ab}$ is given by the following equation (1). The equation of the color difference is described in references 1 and 2.

$$\alpha E^*_{ab} = [(\Delta L^*)^2 + (\Delta a^*)^2 + (\Delta b^*)^2]^{1/2} \tag{1}$$

After calculating the color differences of the printing press stability determination patches 4*b*1 to 4*b*4, the CPU 1-1 reads out, from the memory 1-18, a color difference allowable value in correspondence with the patches 4*b*1 to 4*b*4 (step S819). The CPU 1-1 compares the color difference allowable value read out in step S819 with the color differences of the respective patches 4*b*1 to 4*b*4 calculated in step S818. The CPU 1-1 then stores the comparison results in the RAM 1-2 and displays them on the screen of the display device 1-5 (step S820). The CPU 1-1 checks whether the color differences of the printing press stability determination patches 4*b*1 to 4*b*4 are equal to or smaller than the allowable value on the basis of the comparison results (step S821). As a result of check, if there is at least one patch having the color difference larger than the allowable value, an alarm signal is output (step S822). This alarm signal makes the alarm unit 1-19 generate a warning to inform the operator of a change in stability of the printing press.

When the warning is generated by the alarm unit 1-19, the operator adjusts the state of the printing press as needed and regenerates a printing press profile. More specifically, the operator regenerates the printing press profile in accordance with flow charts in FIGS. 5 and 6.

Figure 10:
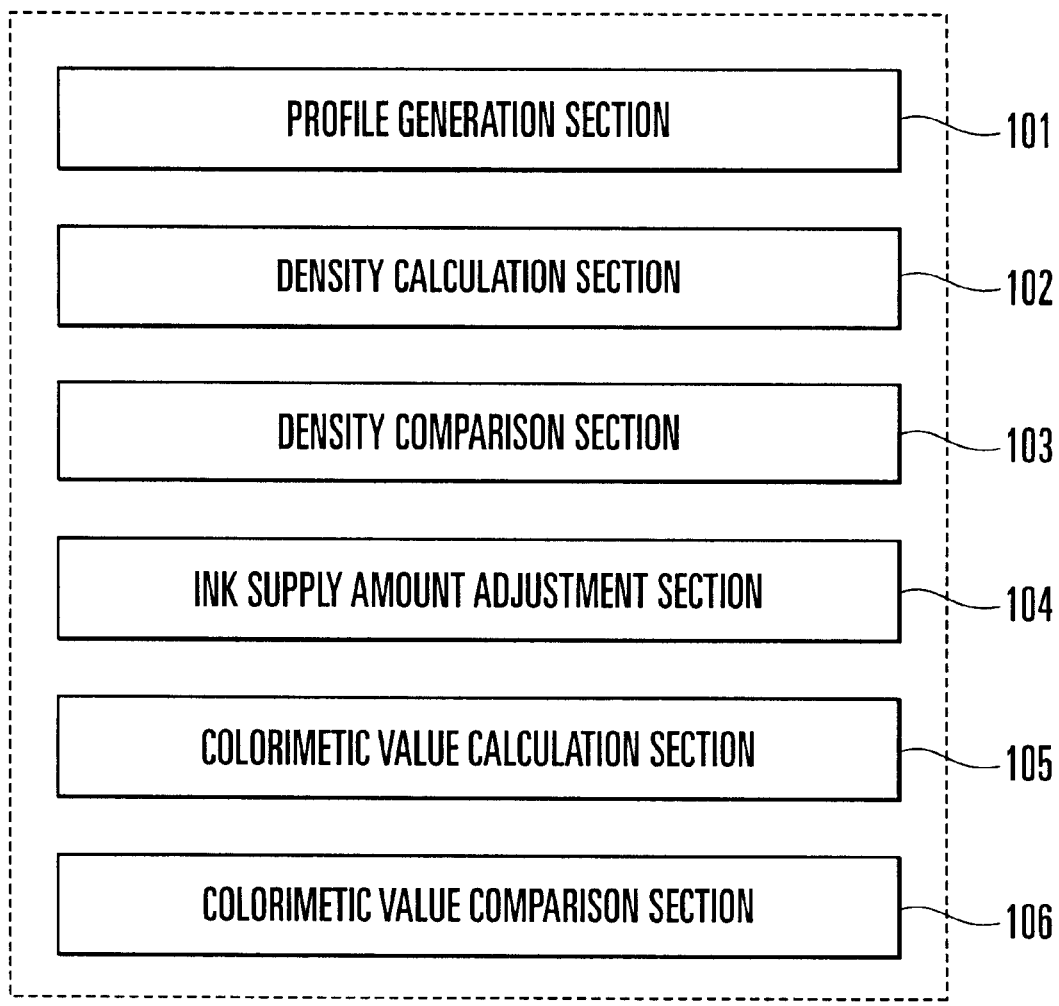
FIG. 10 is a functional block diagram of a CPU 1-1.

FIG. 10 shows the function of the CPU 1-1. As shown in FIG. 10, the CPU 1-1 comprises a profile generation section 101 for executing steps S615 and S616 in FIG. 6, a density calculation section 102 for executing step S716 in FIG. 7, a density comparison section 103 for executing steps S718 to S721 in FIG. 7, an ink supply amount adjustment section 104 for executing step S722 in FIG. 7, a colorimetic value calculation section 105 for executing step S815 in FIG. 8, and colorimetic value comparison section 106 for executing steps S818 to S821 in FIG. 8.

As described above, according to this embodiment, the color differences of the printing press stability determination patches 4*b*1 to 4*b*4 are frequently checked in ordinary printing, so that a change in stability of the printing press can early be found. When finding a change in stability of the printing press, the operator regenerates a printing press profile, thereby maintaining color matching precision without adjusting the ink supply amount manually.

According to this embodiment, color data sampling for the density value measurement and colorimetic value measurement are performed by automatic scanning using the calorimeter 2-4, thereby shortening a time for each measurement. Since the density value measurement and colorimetic value measurement are performed by the single calorimeter 2-4, the characteristic difference between the densitometer and calorimeter is not present, and the high-quality printing press profile can stably be generated.

As has been described above, according to the present invention, the colorimetic values of each printing press stability determination patch are measured, and the measured colorimetic values of each patch are compared with the colorimetic values, in the printing press profile, having a dot area percent almost equal to that of each ink color predetermined in correspondence with each patch. Since a warning is generated on the basis of the comparison result, the operator can early find a change in stability of the printing press.

In addition, the density of the density measurement patch of each ink color is measured, and the ink supply amount of each ink color of a printing press is adjusted such that the measured density value of the patch of each ink color coincides with the reference density value of each ink color. This makes it possible to measure the colorimetic values of each printing press stability determination patch in a state in which the ink film thickness of each ink color is almost uniform, thereby determining a change in stability of the printing press at high precision.

Further, When a warning is generated, a printing press profile is regenerated, so that color matching precision can be maintained without adjusting the ink supply amount manually.

What is claimed is:

1. A color management method for a printing press, comprising the steps of:

measuring colorimetic values of a first patch for generating a profile printed by the printing press, and generating a printing press profile representing a color reproduction characteristic of the printing press from the measured colorimetic values of the first patch and a dot area percent of each ink color predetermined in correspondence with the first patch;

measuring colorimetic values of a second patch for determining stability of the printing press printed by the printing press;

comparing the measured colorimetic values of the second patch with colorimetic values, in the printing press profile, having a dot area percent substantially equal to a dot area percent of each ink color predetermined in correspondence with the second patch; and generating a warning on the basis of a comparison result.

2. A method according to claim 1, further comprising the steps of:

measuring a density of a third patch for measuring a density, for each ink color, printed by the printing press;

comparing a measured density value of the third patch with a reference density value of each ink color; and adjusting an ink supply amount of each ink color in the printing press on the basis of a density comparison result, the step of measuring colorimetic values comprising the step of measuring colorimetic values of the second patch printed by the printing press whose ink supply amount is adjusted.

3. A method according to claim 2, wherein the step of measuring a density, the step of comparing a density value, and the step of adjusting an ink supply amount are repeated until the measured density value of the third patch substantially coincides with the reference density value of each ink color, and the step of measuring colorimetic values comprises the step of measuring the colorimetic values of the second patch printed by the printing press whose ink supply amount is adjusted until the measured density value substantially coincides with the reference density value.

4. A method according to claim 2, wherein the step of adjusting an ink supply amount comprises the step of adjusting an ink supply amount of each ink color in the printing press on the basis of the density value comparison result such that the measured density value of the third patch substantially coincides with the reference value of each ink color.

5. A method according to claim 1, further comprising the step of regenerating the printing press profile when the warning is generated.

6. A color management apparatus for a printing press, comprising:
   measurement means for measuring at least color data of a first patch for generating a profile and a second patch for determining a stability of the printing press, which are printed by the printing press;
   colorimetic value calculation means for calculating the colorimetic values of each of the first and second patches from the color data output from said measurement means;
   profile generation means for generating a printing press profile, representing a color reproduction characteristic, on the basis of the colorimetic values of the first patch output from said colorimetic value calculation means and a dot area percent of each ink color predetermined in correspondence with the first patch;
   colorimetic value comparison means for comparing the colorimetic values of the second patch output from said colorimetic value calculation means with colorimetic values, in the printing press profile, having a dot area percent substantially equal to a dot area percent of each ink color predetermined in correspondence with the second patch; and
   alarm means for generating a warning on the basis of a comparison result output from said colorimetic value comparison means.

7. An apparatus according to claim 6, wherein said measurement means further measures color data of a third patch for measuring a density, for each ink color, printed by the printing press.

8. An apparatus according to claim 7, further comprising:
   density calculation means for calculating a density of the third patch from the color data output from said measurement means;
   density comparison means for comparing a reference density value of each ink color with a density value of the third patch output from said density calculation means; and
   ink supply amount adjustment means for adjusting an ink supply amount of each ink color in the printing press on the basis of a comparison result output from said density comparison means,
   wherein said colorimetic value calculation means calculates colorimetic values of the second patch printed by the printing press whose ink supply amount is adjusted.

9. An apparatus according to claim 8, wherein said measurement means, said density calculation means, said density comparison means, and said ink supply amount adjustment means repeat color data measurement, density calculation, density comparison, and ink supply amount adjustment, respectively, until the measured density value of the third patch substantially coincides with the reference density value of each ink color as a result of comparison, and
   after said density comparison means outputs a comparison result representing that the measured density value substantially coincides with the reference density value, said colorimetic value calculation means calculates the colorimetic values of the second patch printed by the printing press whose ink supply amount is adjusted.

10. An apparatus according to claim 8, wherein said ink supply amount adjustment means adjusts an ink supply amount of each ink color in the printing press in accordance with the comparison result from said density comparison means such that the measured density value of the third patch substantially coincides with the reference density value of each ink color.

11. An apparatus according to claim 6, wherein when the warning is generated, said profile generation means regenerates the printing press profile.

* * * * *